US012754514B2

(12) United States Patent
Bravo et al.

(10) Patent No.: US 12,754,514 B2
(45) Date of Patent: Oct. 6, 2026

(54) DEVICE FOR AUTONOMOUSLY ADJUSTING THE ACTIVE LENGTH OF A BALANCE SPRING

(71) Applicant: The Swatch Group Research and Development Ltd, Marin (CH)

(72) Inventors: Paulo Bravo, Marin-Epagnier (CH); Andres Cabezas Jurin, Yverdon-les-Bains (CH)

(73) Assignee: The Swatch Group Research and Development Ltd, Marin (CH)

( * ) Notice: Subject to any disclaimer, the term of this patent is extended or adjusted under 35 U.S.C. 154(b) by 295 days.

(21) Appl. No.: 18/435,455

(22) Filed: Feb. 7, 2024

(65) Prior Publication Data

US 2024/0302797 A1 Sep. 12, 2024

(30) Foreign Application Priority Data

Mar. 6, 2023 (EP) .................................... 23160132

(51) Int. Cl.
*G04B 18/04* (2006.01)
*G04B 17/06* (2006.01)

(52) U.S. Cl.
CPC ............. *G04B 18/04* (2013.01); *G04B 17/06* (2013.01)

(58) Field of Classification Search
None
See application file for complete search history.

(56) References Cited

U.S. PATENT DOCUMENTS

2017/0227930 A1* 8/2017 Di Domenico ...... G04B 17/045
2019/0187618 A1* 6/2019 Bravo ................. G04B 17/063

FOREIGN PATENT DOCUMENTS

CH 705605 A2 * 4/2013 ............. G04B 18/06
EP 3502788 A1 6/2019

OTHER PUBLICATIONS

European Search Report of No. 23160132.9 dated Jul. 12, 2023.

* cited by examiner

*Primary Examiner* — Renee S Luebke
*Assistant Examiner* — Michael James Walker
(74) *Attorney, Agent, or Firm* — Sughrue Mion, PLLC

(57) ABSTRACT

A device (6) for autonomously adjusting the active length of a balance spring (5), for an oscillator (4, 5) of the sprung balance type, including a cock (12) mounted on a plate (13) of a horological movement (2) and in which cock a balance staff pivots, the balance spring (5) including an inner end integral with the balance staff and an outer end integral with a first stud (8) fastened to a stud-holder (10), the stud-holder (10) being pivotally mounted on the cock (12) concentrically with the balance staff, and means for modifying the active length of the balance spring (5).

15 Claims, 6 Drawing Sheets

DEVICE FOR AUTONOMOUSLY ADJUSTING THE ACTIVE LENGTH OF A BALANCE SPRING

CROSS REFERENCE TO RELATED APPLICATIONS

This application is claiming priority based on European Patent Application No. 23160132.9 filed on Mar. 6, 2023.

TECHNICAL FIELD OF THE INVENTION

The invention relates to a device for autonomously adjusting the active length of a balance spring, for an oscillator of the sprung balance type.

The invention further relates to a horological movement including the device for autonomously adjusting the active length of a balance spring and an oscillator of the sprung balance type.

The invention further relates to a timepiece, in particular a watch, including the horological movement.

TECHNOLOGICAL BACKGROUND

In watches fitted with mechanical oscillators of the sprung balance type, mechanisms for manually adjusting the active length of the balance spring are known.

For example, in regular manual adjustment mechanisms, the outer end of the balance spring is immobilised by a stud fastened to a stud-holder integral with a cock. An index that can rotate relative to the stud-holder is provided to adjust the active length of the balance spring, thereby allowing the frequency of the sprung balance to be adjusted. The index is a pivoting lever, typically provided with two arms, centred on the coordinate of the balance staff. A first arm of the index carries, for example, two pins between which the balance spring is free. A second arm of the index can be manually operated to rotate the index through a certain angle about the balance staff. This allows the actual position of the counting point to be changed. As the index rotates, the active length of the balance spring reduces or increases. However, one drawback of such a manual adjustment device is that the earth's gravity influences the oscillation frequency of the sprung balance depending on the orientation of the corresponding horological movement. As a result, the rate of a watch can vary significantly, in particular between its horizontal and vertical positions. Moreover, when the balance spring moves between the pins due to the play therebetween, the oscillations of the sprung balance alter its active length and thus cause a slight variation in the oscillation frequency of the sprung balance assembly.

In order to limit the negative effects of gravity, one solution known in particular from patent CH 705 605 B1, implements a device for adjusting the active length of the balance spring, wherein the index carries clamping means designed to clamp an end portion of the balance spring in order to define the active length thereof. The outer end of the balance spring is also integral with a fastening system movably mounted relative to the index and arranged to cooperate therewith. The clamping means, consisting for example of a pin/eccentric clamping system wherein the end portion of the balance spring is clamped, can be loosened or tightened at will by a watchmaker. Once the watchmaker has loosened the pin/eccentric clamping system, the fastening system can be moved using a tool, thus allowing the balance spring to be moved relative to the index, which remains stationary, and thus relative to the pin, thus allowing the active length of the balance spring to be modified. The watchmaker can then clamp the balance spring against the pin by tightening the clamping system, to return the adjustment device to its operating position. However, such a solution remains a manual adjustment solution, which has the drawback of considerably limiting the precision of the adjustment used to offset the effects of gravity. Moreover, such a solution is tedious to implement, due to the various manual adjustment steps to be carried out by a watchmaker to make the adjustment.

SUMMARY OF THE INVENTION

The purpose of the invention is thus to provide a device for adjusting the active length of a balance spring, for an oscillator of the sprung balance type, making it possible to offset the effects of gravity, in particular disturbances to the isochronism of the balance of the oscillator, in a simple, precise and autonomous manner, and compensating for the above-mentioned drawbacks of the prior art.

To this end, the invention relates to a device for autonomously adjusting the active length of a balance spring, for an oscillator of the sprung balance type, comprising a cock mounted on a plate of a horological movement and in which cock a balance staff pivots, the balance spring having an inner end integral with the balance staff and an outer end integral with a first stud fastened to a stud-holder, the stud-holder being pivotably mounted on the cock concentrically with the balance staff, and means for modifying the active length of the balance spring.

According to the invention, the means for modifying the active length of the balance spring comprise:

- a lever capable of pivoting on the stud-holder between a rest position and two correction positions of the device, the lever having a first free end and a second end 601 having two beaks 601, 602;
- resilient stressing means configured to exert a resilient restoring action on the lever;
- an inertia block rotatable about a shaft on which a cam is mounted, the inertia block being arranged to rotate freely about the shaft as a function of gravity, the rotation of the inertia block rotating the cam and pivoting the lever so that one of the beaks acts on the balance spring and simultaneously changes the active length of the balance spring;
- damping means comprising a toothed wheel coaxial with the inertia block and mounted on the inertia block, and a damping device arranged to cooperate with the inertia block via the toothed wheel and to limit the change in the active length of the balance spring in the event of sudden acceleration or deceleration.

In accordance with other advantageous alternative embodiments of the invention:

- the stud-holder comprises an extension provided with an opening through which a pivot pin for the lever passes;
- the lever comprises, at its second end, a ball bearing through which the pivot pin passes;
- the opening is oblong so that the position of the lever can be adjusted in relation to the balance spring;
- the resilient stressing means configured to exert a resilient restoring action on the lever are integral with the plate;
- the resilient stressing means configured to exert a resilient restoring action on the lever are integral with the stud-holder;
- the cam is a radial cam with an external profile;
- when the device is in the rest position, a flat portion of the cam is in contact with the lever, and when the device is in the correction position, a corner or angle of the cam is in contact with the lever;

the cam is in permanent contact with the free end of the lever whatever the position of the inertia block;

the inertia block is a solid half-disc;

the device comprises an air damper, the damper being in the form of a body with a cavity of similar shape to that of the inertia block, the inertia block being arranged to pivot in the cavity;

The device comprises a heart-shaped cam mounted on the shaft, the heart-shaped cam being arranged to cooperate with a spring, the assembly forming a device for resetting the position of the lever;

the heart-shaped cam is superimposed on the cam.

One advantage of the adjusting device according to the invention lies in the fact that it comprises an inertia block mounted so as to rotate freely and cooperating indirectly with a movable arm arranged to act on the outer coil of the balance spring. Rotation of the inertia block, which is freely subject to gravity, thus causes the arm to move between a rest position and a correction position of the device, and simultaneously acts on the balance spring to modify the active length of the balance spring, allowing the latter to be adjusted in order to compensate for disturbances to the isochronism of the balance due to gravity. As a result, the adjustment device according to the invention allows the oscillator's rate to be precisely compensated for as a function of its position in space, by offsetting the disturbances to the isochronism of the balance due to gravity, in an autonomous manner.

The invention further relates to a horological movement including the adjustment device described above, and which includes the features mentioned in dependent claim 14.

The invention further relates to a timepiece including the horological movement described above, and which includes the features mentioned in dependent claim 15.

Further features and advantages of the present invention will become apparent from the following description of a preferred embodiment, given by way of a non-limiting example with reference to the accompanying drawings.

BRIEF DESCRIPTION OF THE FIGURES

The purposes, advantages and features of the device for adjusting the active length of a balance spring, and of the horological movement and timepiece comprising it, will become clearer in the following description which is given on the basis of at least one non-limiting embodiment illustrated by the drawings in which.

DETAILED DESCRIPTION OF THE INVENTION

In the following description, reference is made to a horological movement equipped with a device for adjusting the active length of a balance spring, for an oscillator of the sprung balance type. The usual components of the horological movement, which are well known to a person skilled in the art, are described only in simplified form or not at all. A person skilled in the art will be able to adapt these various components and make them cooperate for the operation of the horological movement. In particular, everything relating to the escapement mechanism of the horological movement will not be described below, although such an escapement mechanism can advantageously cooperate with the adjustment device according to the invention.

Figure 1:
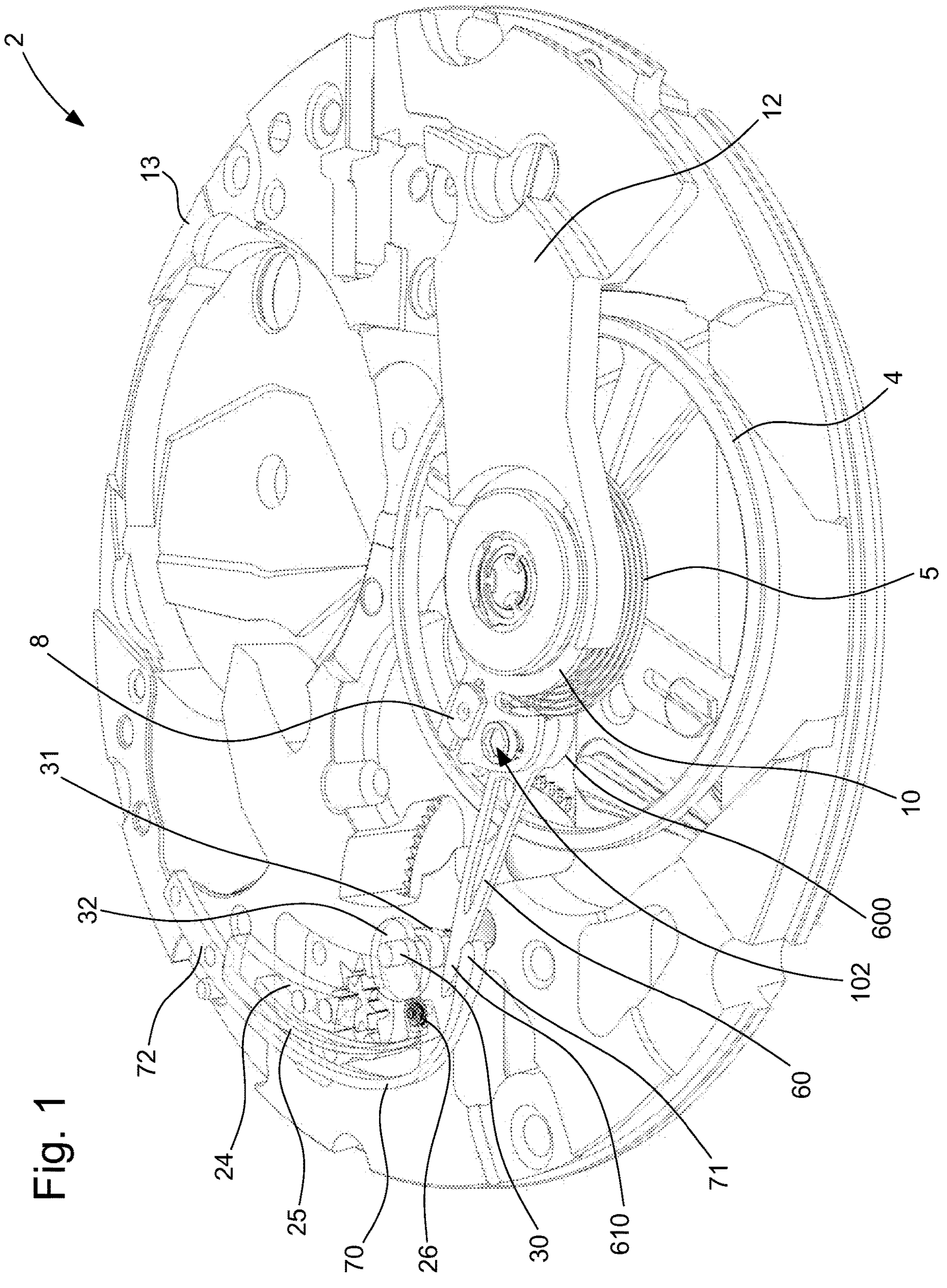
FIG. 1 is a top perspective view of a horological movement of a watch comprising a device for adjusting the active length of a balance spring according to a first embodiment of the invention.
Figure 2:
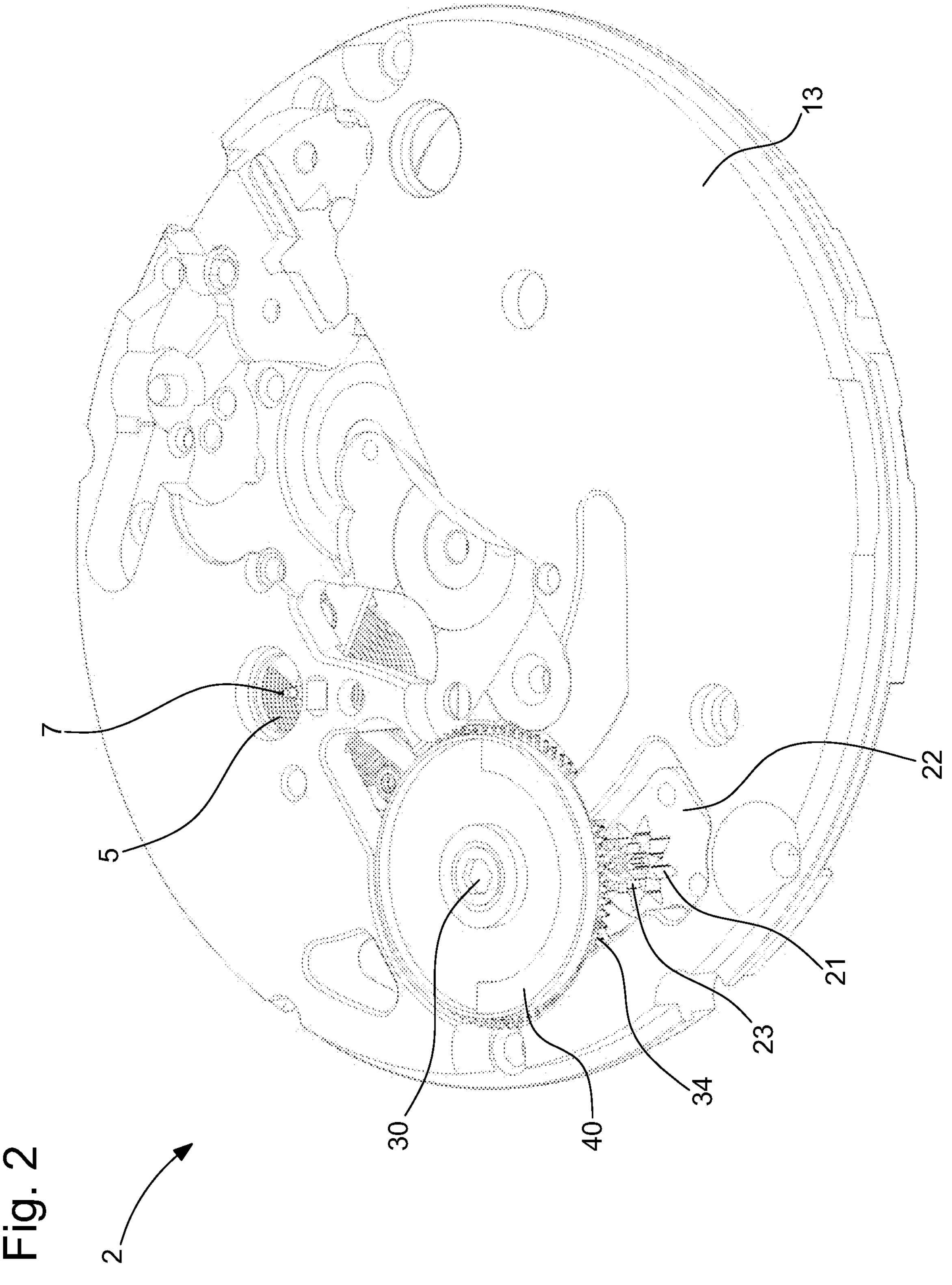
FIG. 2 is a top perspective view of a horological movement of a watch comprising a device for adjusting the active length of a balance spring according to a first embodiment of the invention.
Figure 3:
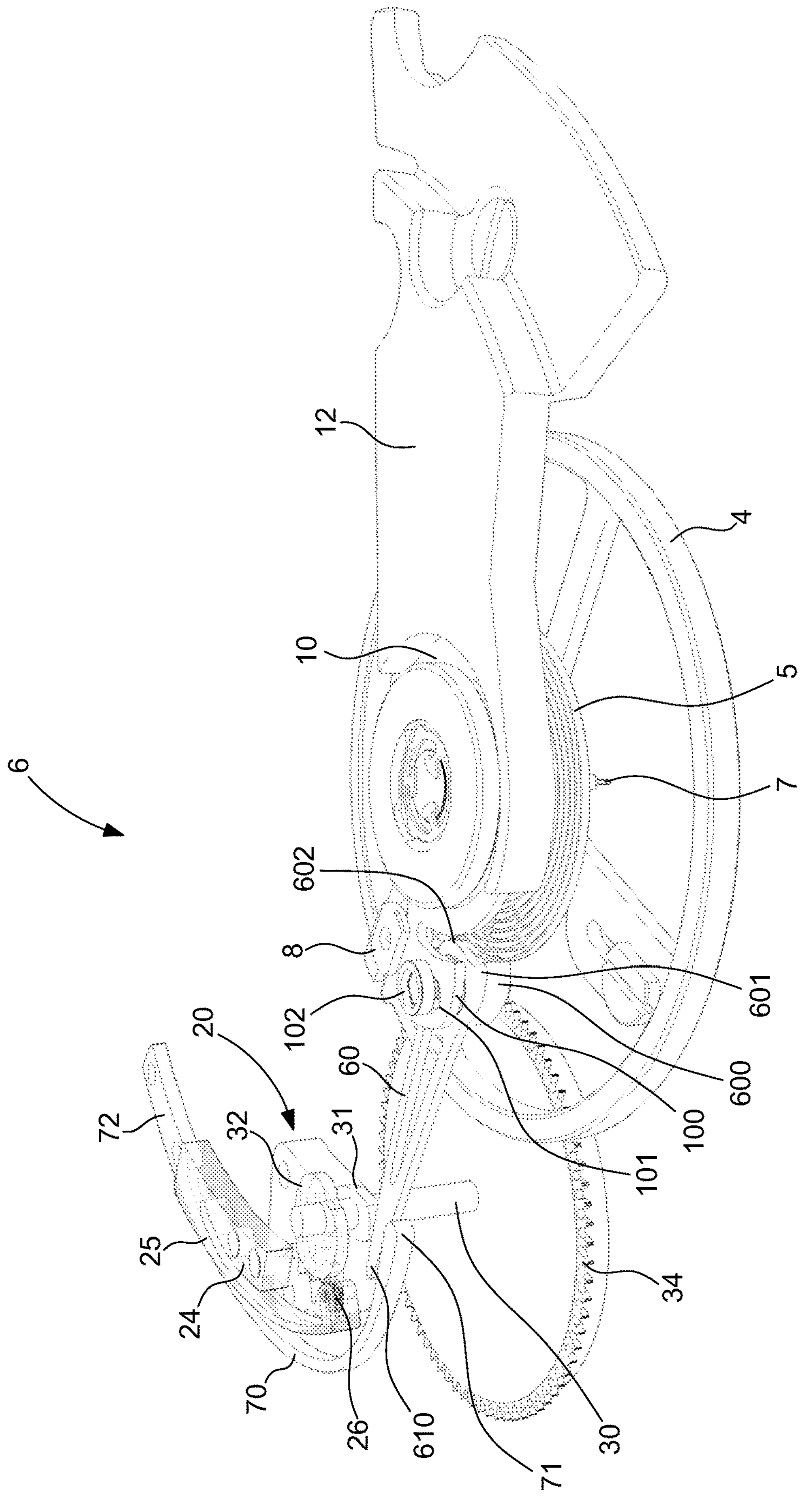
FIG. 3 is a top perspective view of the adjustment device of FIG. 1 according to the first embodiment of the invention.
Figure 4:
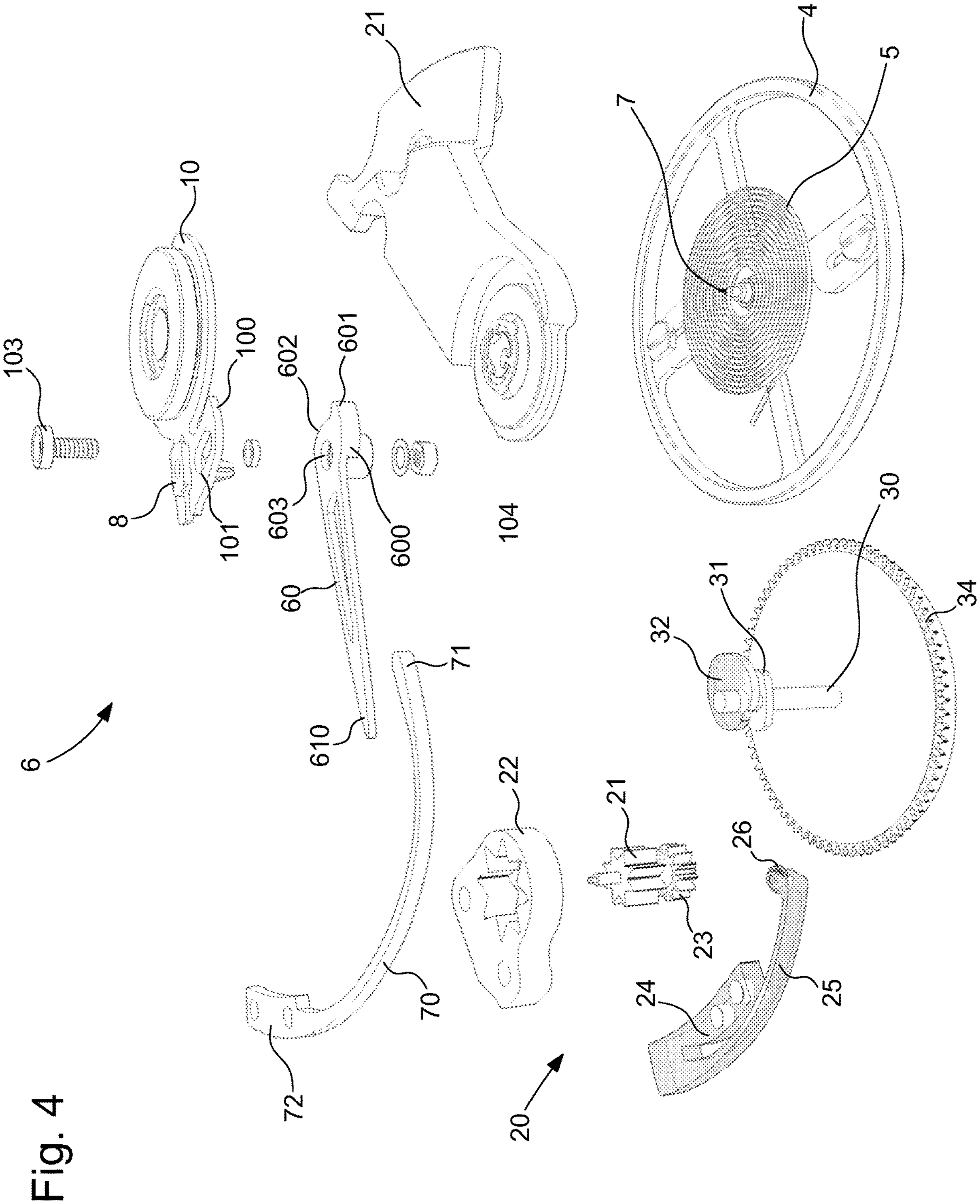
FIG. 4 is an exploded perspective view of the adjustment device of FIG. 1 according to the first embodiment of the invention.

FIG. 1 shows part of a timepiece 1, which includes a horological movement 2. In the particular example embodiment shown in FIG. 1, the timepiece 1 is a watch. The horological movement 2 includes an oscillator equipped with a balance 4 and a balance spring 5, and a device 6 for autonomously adjusting the active length of the balance spring 5. Conventionally, the balance spring 5 is fastened to a staff 7 of the balance 4 by its inner end (not visible). The staff 7 of the balance 4 has one end pivotally mounted in a balance bridge (the latter is not visible in the figures for the sake of clarity). The outer end of the balance spring 5 is fastened in the conventional way to a stud 8 fastened to a stud-holder 10, the stud-holder 10 being made integral with a cock 12 by light clamping. More specifically, the stud-holder 10 is pivotally mounted on the cock 12 concentrically with the staff 7 of the balance 4, as shown in FIG. 2. The staff 7 of the balance 4 is pivotally mounted in the cock 12.

Figure 5A:
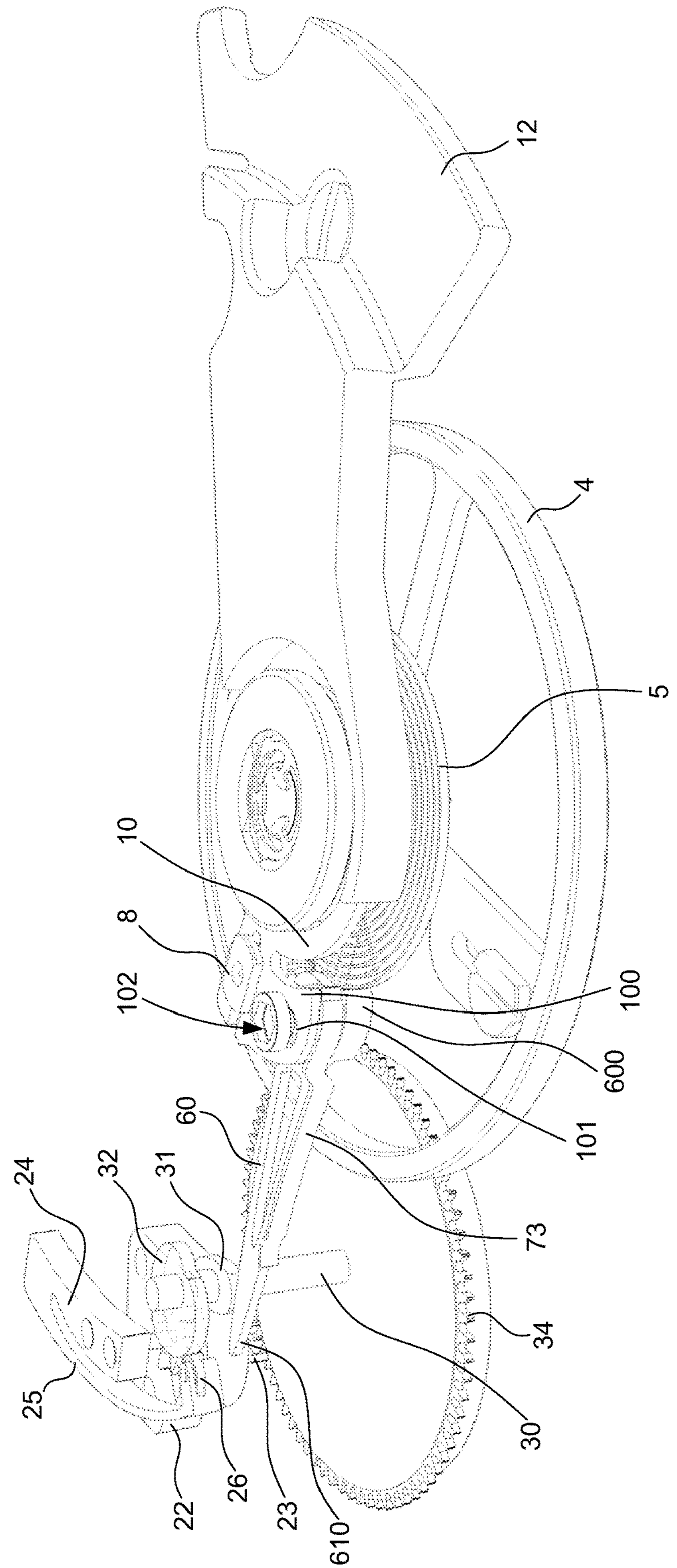
FIGS. 5*a* and 5*b* are top and exploded perspective views respectively of the adjustment device of FIG. 1 according to a second embodiment of the invention.
Figure 5B:
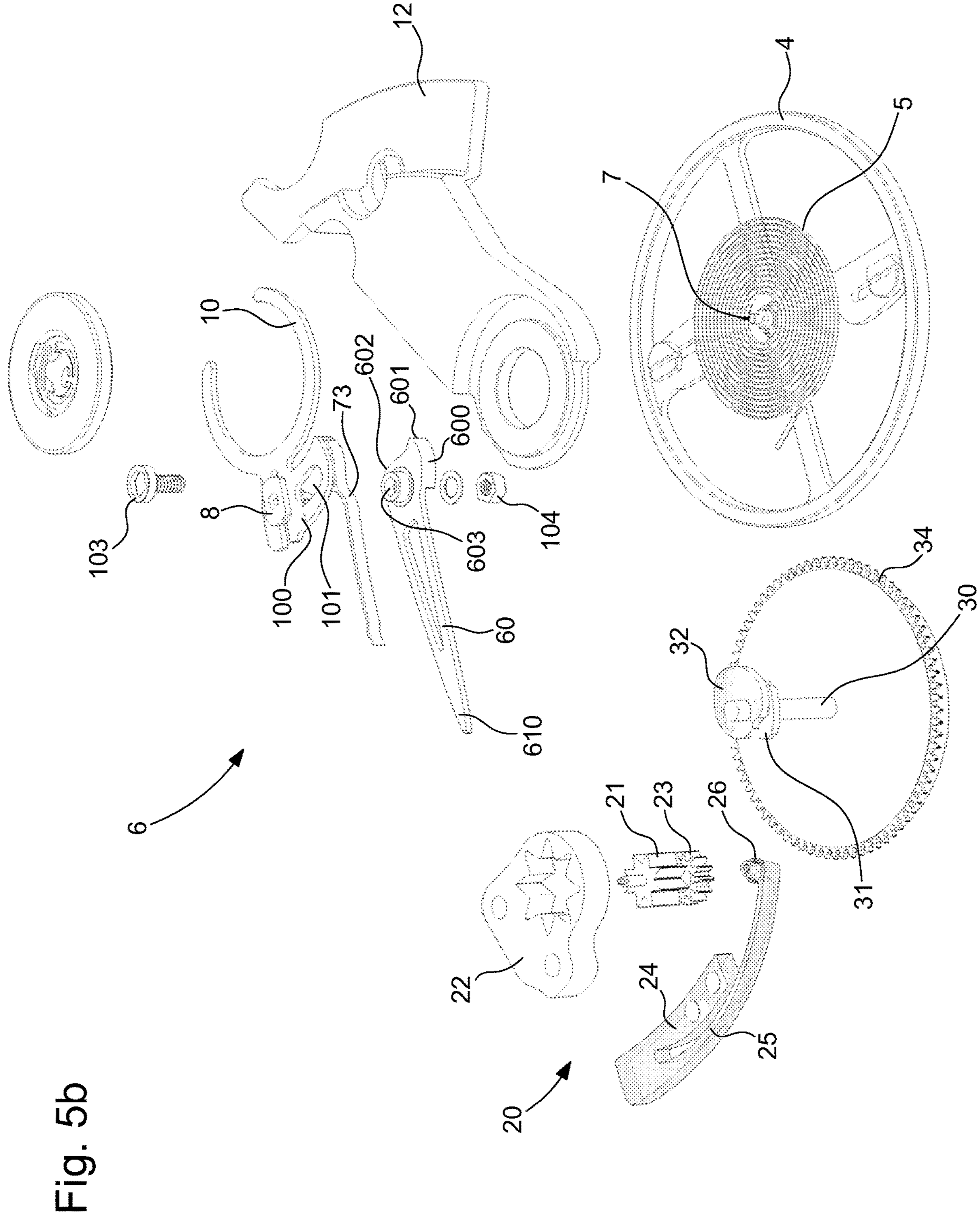

The means 6 for modifying the active length of the balance spring 5 are capable of modifying the active length of the balance spring 5 by acting on the length of the outer coil of the balance spring 5. In the two example embodiments illustrated in FIGS. 1 to 4 and in FIGS. 5*a* and 5*b* respectively, the means for modifying the active length of the balance spring 5 include a lever 60 capable of moving between a rest position and two correction positions of the device. The lever has a first free end 610 and a second end 600 provided with two beaks 601, 602, each beak 601, 602 being arranged to act independently of the other on the outer coil of the balance spring and to modify the active length of the balance spring.

As can be seen from the figures, the stud-holder 10 comprises an extension 100 provided with an opening 101 through which passes a pivot pin 102 about which the lever 60 pivots to move from its rest position to a correction position.

In order to pivot about the pivot pin 102 which is formed by a bolt 103 and a nut 104, the lever comprises, at its second end 600, a ball bearing 603 through which the shank of the bolt 103 passes.

It should also be noted that the opening 101 is oblong in shape so that the position of the lever 60 can be adjusted relative to the balance spring 5. Once the correct position of the lever has been determined, the second end 600 of the lever simply needs to be fastened to the extension 100 of the stud-holder by tightening the bolt 103 and the nut 104.

The means 6 for modifying the active length of the balance spring further comprise an inertia block 40 which can rotate about a shaft 30 on which is mounted a cam 31 against which the free end 610 of the lever 60 rests. The inertia block 40 is arranged so that it can rotate about the shaft 30 as a function of the gravity to which it is subjected, the rotation of the inertia block 40 rotating the cam 31 and moving the lever 60 to act on the outer coil of the balance spring 5 and simultaneously modify the active length of the balance spring.

The adjustment device 6 further comprises damping means comprising a toothed wheel 34 coaxial with the inertia block 40 and integral with the inertia block, and a damping device 20 arranged to cooperate with the inertia block 40 via the toothed wheel 34 and to limit the change in the active length of the balance spring 5 in the event of sudden acceleration or deceleration.

The adjustment device comprises resilient stressing means configured to exert a resilient restoring action on the at least one arm 60. The resilient stressing means take the form of a strip-spring 70, 73. According to the first embodiment illustrated in FIGS. 1 to 4, the strip-spring 70 comprises a first end 71 in contact with the free end 610 of the lever 60 so as to hold the free end 610 against the profile of the cam 31, and a second end integral with the plate 13. According to the second embodiment illustrated in FIGS. 5*a* and 5*b*, the strip-spring 73 is integral with the stud-holder 10 and further allows the free end 610 to be pressed against the profile of the cam 31.

The means for modifying the active length of the balance spring 5 include two pins 19 fastened to the second stud 8', the second end 601 of the arm 60 being arranged so that it slides between the two pins 19 and comes into contact with the outer coil of the balance spring 5 in the correction position and thus modifies the active length of the balance spring.

The inertia block 40 is mounted so as to rotate freely on the shaft 30 on which the cams 31 are mounted, so that rotation of the inertia block 40 causes the lever 60 to move and simultaneously acts on the means for modifying the active length of the balance spring 5. The lever moves under the effect of the rotation of the inertia block 40, which is itself subject to gravity, between a rest position of the device and two correction positions of the device, the beaks 601, 602 of the lever 60 allowing a distinct correction to be made depending on the position of the watch. As illustrated in the figures, the inertia block 40 consists for example of a half-full disc. In an alternative embodiment not shown in the figures, the inertia block 40 consists of a solid bi-material disc, the two materials of the disc having different densities.

Thus, depending on the position of the horological movement 2 in space, the inertia block 40, which is freely subject to gravity, can rotate about its axis of rotation and thus cause the lever 60 to move. In so doing, the rotation of the inertia block 40 simultaneously acts on the means for modifying the active length of the balance spring 5, allowing the active length of the balance spring to be continuously adjusted in order to compensate for disturbances to the isochronism of the balance due to gravity.

In order to prevent the inertia block from forming a loose wheel and upsetting the oscillator 4, 5 instead of correcting it, the adjustment device 6 comprises damping means comprising a toothed wheel 34 coaxial with the inertia block and integral therewith. The damping means comprise a damping device arranged to cooperate with the inertia block via the toothed wheel to limit, or even prevent, the modification of the active length of the balance spring 5 during sudden acceleration or deceleration.

As illustrated in the figures, the damping device 20 is in the form of an air damper, the damper comprising a body 22 with a cavity in which a weight 21 of similar shape to the cavity rotates about a shaft 24. The shaft 24 further includes a pinion 23 arranged to cooperate with the toothing of the toothed wheel 34. Thus, when the inertia block 40 moves, it drives the toothed wheel 34 which meshes with the pinion 23, and causes the weight 21 of the damping device 20 to rotate. It is thus understood that when the inertia block 40 moves considerably, the weight 21 will brake the rotation of the inertia block 40 thanks to the damping device 20. It goes without saying that other types of damper can be used, such as a weight moving in a cylinder, or a magnetic damper.

It should be noted that the shaft 30 carrying the inertia block 40, the toothed wheel 34 and the cam 31, further comprises a heart-shaped cam 32 integral with the shaft 30, and superimposed on the cam 31. The heart-shaped cam 32 is arranged to cooperate with a spring 24, 25, the end 26 of which cooperates with the profile of the heart-shaped cam 32, the assembly thus forming a device for resetting the position of the lever 60 to return it to its natural rest position when the inertia block is no longer subject to gravity.

Preferably, the cam 31 is a radial cam with an external profile. Although a radial cam with a substantially rectangular external profile is shown in FIGS. 1 to 5*b*, in practice the shape envisaged for the external profile of the cam will depend on the type of balance spring 5 used and the correction to be made thereto. For example, a radial cam with a triangular, oblong or ovoid external profile can also be used in the context of the present invention. Preferably, when the adjustment device 6 is in the rest position, a flat portion of the cam is in contact with the free end 610 of the lever 60, whereas when the device 6 is in the correction position, a corner or angle of the cam 31 is in contact with the free end 610 of the lever 60. Even more preferably, the cam 31 is in contact with the lever 60 whatever the position of the inertia block 40.

It is thus conceivable that, depending on the position of the horological movement 2 in space, the inertia block 40, which is freely subject to gravity, can rotate about its axis of rotation and thus cause the lever 60 to move. In so doing, this rotation of the inertia block 40 simultaneously acts on the means for modifying the active length of the balance spring 5, making it possible to continuously adjust the active length of the balance spring in order to compensate for disturbances to the isochronism of the balance due to gravity. Rotation of the inertia block 40 rotates the shaft 30 and causes the cam 31 which is integral with the shaft 30 to move, the cam then acting on the free end 610 of the lever 60 and moving the latter so that the second end 600 of the lever pivots about the pivot pin 102 and so that one of the beaks 601, 601 comes into contact with the balance spring 5 so as to modify the active length of the balance spring.

Once the inertia block has stabilised following its change of position, the device will return to its rest position by itself thanks to the action of the spring 24, 25 on the heart-shaped cam 32, which is also integral with the shaft 30.

The invention further relates to a horological movement 2 including an oscillator 4, 5 of the sprung balance type and a device 6 for autonomously adjusting the active length of the balance spring 5 as described above.

The invention further relates to a timepiece 1 comprising a horological movement 2 equipped with a device 6 for autonomously adjusting the active length of the balance spring 5 as described above.

The invention claimed is:

1. A device for autonomously adjusting the active length of a balance spring, for a balance spring oscillator, comprising a cock mounted on a plate of a horological movement and in which cock a staff of the balance pivots, the balance spring including an inner end integral with the staff of the balance and an outer end integral with a first stud fastened to a stud-holder, the stud-holder being pivotally mounted on the cock concentrically with the staff of the balance, and means for modifying the active length of the balance spring;

wherein the means for modifying the active length of the balance spring comprise:

a lever capable of pivoting on the stud-holder between a rest position and two correction positions of the device, the lever having a first free end and a second end having two beaks;

resilient stressing means configured to exert a resilient restoring action on the lever;

an inertia block rotatable about a shaft on which a cam is mounted, the inertia block being arranged to rotate freely about the shaft as a function of gravity, the rotation of the inertia block rotating the cam and pivoting the lever so that one of the beaks acts on the balance spring and simultaneously modifies the active length of the balance spring; and damping means comprising a toothed wheel coaxial with the inertia block and mounted on the inertia block, and a damping device arranged to cooperate with the inertia block via the toothed wheel and to limit the change in the active length of the balance spring in the event of sudden acceleration or deceleration.

2. The device for autonomously adjusting the active length of a balance spring according to claim 1, wherein the stud-holder comprises an extension provided with an opening through which passes a pivot pin for the lever.

3. The device for autonomously adjusting the active length of a balance spring according to claim 2, wherein the lever comprises, at its second end, a ball bearing through which the pivot pin passes.

4. The device for autonomously adjusting the active length of a balance spring according to claim 2, wherein the opening is oblong in shape in order to be able to adjust the position of the lever relative to the balance spring.

5. The device for autonomously adjusting the active length of a balance spring according to claim 1, wherein the resilient stressing means configured to exert a resilient restoring action on the lever are integral with the plate.

6. The device for autonomously adjusting the active length of a balance spring according to claim 1, wherein the resilient stressing means configured to exert a resilient restoring action on the lever are integral with the stud-holder.

7. The device for autonomously adjusting the active length of a balance spring according to claim 1, wherein the cam is a radial cam with an external profile.

8. The device for autonomously adjusting the active length of a balance spring according to claim 1, wherein, when the device is in the rest position, a flat portion of the cam is in contact with the lever, and when the device is in the correction position, a corner or angle of the cam is in contact with the lever.

9. The device for autonomously adjusting the active length of a balance spring according to claim 1, wherein the cam is in permanent contact with the free end of the lever whatever the position of the inertia block.

10. The device for autonomously adjusting the active length of a balance spring according to claim 1, wherein the inertia block is a solid half-disc.

11. The device for autonomously adjusting the active length of a balance spring according to claim 1, wherein the device comprises an air damper, the damper being in the form of a body with a cavity of similar shape to that of the inertia block, the inertia block being arranged to pivot in the cavity.

12. The device for autonomously adjusting the active length of a balance spring according to claim 1, further comprising a heart-shaped cam mounted on the shaft, the heart-shaped cam being arranged to cooperate with a spring, the assembly forming a device for resetting the position of the lever.

13. The device for autonomously adjusting the active length of a balance spring according to claim 12, wherein the heart-shaped cam is superimposed on the cam.

14. A horological movement including an oscillator of the sprung balance type and the device for autonomously adjusting the active length of the balance spring in accordance with according to claim 1.

15. A timepiece including the horological movement in according to claim 14.

* * * * *